(12) United States Patent
Chernock et al.

(10) Patent No.: US 6,806,887 B2
(45) Date of Patent: Oct. 19, 2004

(54) SYSTEM FOR INTEGRATING PERSONALIZED DATA WITH VISUAL CONTENT

(75) Inventors: Richard S. Chernock, Newtown, CT (US); Paolo Dettori, Elmsford, NY (US); Frank A. Schaffa, Hartsdale, NY (US); David I. Seidman, Chicago, IL (US)

(73) Assignee: International Business Machines Corporation, Armonk, NY (US)

(*) Notice: Subject to any disclaimer, the term of this patent is extended or adjusted under 35 U.S.C. 154(b) by 272 days.

(21) Appl. No.: 09/826,120

(22) Filed: Apr. 4, 2001

(65) Prior Publication Data

US 2002/0171670 A1 Nov. 21, 2002

(51) Int. Cl.$^7$ ................................................. G09G 5/00
(52) U.S. Cl. ..................................................... 345/629
(58) Field of Search ........................ 345/629, 631–641, 345/716–718, 722–724, 744–747, 788, 789, 811

(56) References Cited

U.S. PATENT DOCUMENTS

| | | |
|---|---|---|
| 5,301,028 A | 4/1994 | Banker et al. |
| 5,428,417 A | 6/1995 | Lichtenstein |
| 5,633,678 A | 5/1997 | Parulski et al. |
| 5,712,994 A | 1/1998 | Jefferson et al. |
| 5,822,123 A | 10/1998 | Davis et al. |
| 5,986,650 A | 11/1999 | Ellis et al. |
| 5,991,799 A * | 11/1999 | Yen et al. ................. 709/218 |
| 6,020,880 A | 2/2000 | Naimpally |
| 6,154,205 A | 11/2000 | Carroll et al. |
| 6,195,692 B1 * | 2/2001 | Hsu ........................... 709/219 |
| 2002/0088001 A1 * | 7/2002 | Zustak et al. ............... 725/109 |

* cited by examiner

Primary Examiner—Matthew C. Bella
Assistant Examiner—G. F. Cunnigham
(74) Attorney, Agent, or Firm—Thu Ann Dang Ryan, Mason & Lewis, LLP (57) ABSTRACT

A personalized data delivery system for dynamically integrating viewer-specified data with visual content includes an input port for receiving a visual content signal, an output port for displaying enhanced visual content on a display, and an interface operatively coupled to the input and output ports. The personalized data delivery system may also include an input/output port for receiving data from a data content source other than the visual content signal and/or for sending requests for viewer specified data to the data content source. Parameters for the selection and display of data can be customized by the viewer. The interface includes at least one processor responsive to one or more viewer personalization parameters and operative to integrate at least a portion of the received data with the visual content signal in accordance with the personalization parameters.

25 Claims, 7 Drawing Sheets

SYSTEM FOR INTEGRATING PERSONALIZED DATA WITH VISUAL CONTENT

FIELD OF THE INVENTION

The present invention relates generally to data delivery systems, and more specifically relates to techniques for integrating personalized data with visual content.

BACKGROUND OF THE INVENTION

In conventional data delivery systems, such as an Internet-connected personal computer (PC), methods for requesting and receiving specific information are well established. In an Internet environment, for example, a user may request information by selecting a particular Web page or Web site (e.g., by clicking on a uniform resource locator (URL) link or typing in the URL address for the Web site in a Web browser), in which case the user is generally presented with information which is the same for all users accessing this Web page. Personalization of information, within the context of a dynamically modified Web page, often takes the form of advertisements (e.g., "banners") which are displayed on the Web page. These advertisements may be selected based upon the user's perceived interests and can be dynamically updated on the user's display device.

Another example of a personalized information display appears in "customized" Web pages, such as My Yahoo!™, in which a user, after being identified to the hosting site, typically by logging in or through the use of "cookies," is presented with information which the user has previously selected from a list of categories. For example, each time the user logs in to this custom Web page, preselected information is displayed, such as a list of stock prices for the user's portfolio, sports results for selected teams, news stories in selected categories or based on selected keywords, etc. Furthermore, some systems offer the capability of automatically alerting the user when certain preselected information is displayed or updated.

In the field of broadcast television, there is significantly less opportunity for a user to select and/or view personalized information on his or her television monitor. The viewer generally chooses from one of several available information sources (stations) by selecting a desired channel to view. Some television monitors offer a picture-in-picture (PIP) feature which provides a small window on the television screen in which a second channel may be displayed, thus allowing the viewer to observe two channels on the same screen simultaneously. The PIP window may even be customizable in terms of size or position on the screen, although the information displayed in this window is not personalized but rather is merely the same channel information available to all viewers.

It is well established that certain information may be added to the basic television signal, such as, for example, current time or local weather (e.g., scrolling across the bottom of a channel), for display to the user. This added information, however, is the same for all viewers. In the case of closed-caption information which may be transmitted with the broadcast signal (e.g., during the vertical blanking interval (VBI) portion of the television signal), a user, with an appropriate decoding unit, has the option of whether to view the closed-caption text or not, as well as the option of viewing the closed-caption text in one of several languages. "Simulcasts" of multiple language audio tracks are also known in the art.

The display of graphics, image and/or text information superimposed over video is well known in the art. For example, this technology is found in on-screen menu systems, such as conventionally used by televisions, VCRs, video cameras and the like, for modifying one or more characteristics, settings, and/or features of the device (e.g. for setting the date/time or changing the brightness, contrast, color, etc.). Such graphics and/or text information may be shown, for example, over the existing video, without video, or with the video shown in a separate window positioned on the screen. Electronic Program Guides (EPGs), such as those described in U.S. Pat. No. 5,986,650 to Ellis, et al., U.S. Pat. No. 5,822,123 to Davis, et al. and U.S. Pat. No. 5,201,028 to Banker, et al., are further examples of on-screen menu techniques that are conventionally employed. Still images may also be overlaid with text or graphics, as disclosed in U.S. Pat. No. 5,633,678 to Parulski, et al. and U.S. Pat. No. 5,428,417 to Lichtenstein. The information displayed in the above examples, however, is not personalized information.

U.S. Pat. No. 6,020,880 to Naimpally is directed to a system in which programming information is retrieved from a server and stored (for display) in a television receiver. However, this system is neither selective nor personalized since the viewer cannot select what information is to be obtained for display.

A television viewer is provided with a very limited choice of broadcast options, especially when compared to a PC user who can retrieve information from an almost unlimited number of sources. Presently, there is no known technique which combines the capabilities for selection of information in both the Internet and broadcast television environments. While a user may view broadcast television information and Internet information in two independent windows concurrently on the display screen of a PC with television viewing capability, there is no coordination between these media. Similarly, a television or set-top box (STB) Internet browser (e.g., WebTV™) enables the viewing of Internet Web pages on a user's television, but it does not offer integration of Internet data on the video frame. There exists no means in the prior art to coordinate the display of broadcast video information and user-selected Internet information on a viewer's television screen and allow personalization of the displayed information. Similar limitations exist for prerecorded video, such as from a VCR tape or DVD disk.

In view of the above problems, there is a need, therefore, in the field of data delivery, for a system which takes advantage of and integrates the strengths of both broadcast (or other) video and Internet (or other) data, allowing a user to view video while maintaining visual contact with information which he/she selects and deems significant. Rather than being dependent on the broadcaster's choice of information (such as time, weather, or traffic conditions) to display to all viewers during a program, a system is needed which allows each individual user to select what information to view, how it should appear on the screen, how often it should be updated, and how often it should be displayed.

Moreover, what is needed is a system which enables the video viewer who does not have an Internet connection to view selected and personalized information on his/her television screen, by choosing among information options which are broadcast with the video/audio signal. What is needed is a system which allows the non-Internet-connected viewer to select what information to view, how it should appear on the screen, how often it should be updated, and how often it should be displayed.

What is needed is a system which enables the video viewer to create a "look and feel" for the display of information which is based on the viewer's choices, as opposed to being preset by a broadcaster or other service provider. What is needed is a system which enables the video viewer to create a viewing environment incorporating live broadcast or prerecorded video with the viewer's choice of information display.

SUMMARY OF THE INVENTION

The present invention provides techniques for integrating viewer-selected data obtained from a content server (e.g., the Internet) or other data source, with visual content (e.g., television or video), and to display the resulting output in a manner customizable by the viewer, thus creating a personalized data delivery and display system. Such a system, particularly when used in the home, may be considered a "home-cast" system, incorporating broadcast and personalized content.

In one illustrative aspect of the invention, a set-top box (STB) is provided which includes a processor and memory for performing the methodologies of the invention. Application software running on the STB may operate consistent with a traditional Web browser in the sense that it is able to access viewer-specified information sources and retrieve information contained therein. However, the personalized home-cast system of the invention is novel in that, unlike conventional Web browsing systems and/or methodologies, data obtained from a Web page or equivalent content server is not bound by a traditional preset format. Instead, the STB and associated application program running on the STB, in accordance with the invention, uniquely integrates the data obtained from a content server or other information source with a video frame in a manner which is selectable by the viewer.

The invention provides a viewer with the capability of creating a customized and dynamic display of selected information for display during the viewing of any visual content. In one aspect of the invention, information may be retrieved from the Internet or from a dedicated information server operatively connected to the STB via a communication channel (e.g., telephone line). System parameters affecting the operation of the STB, including features and information display options, are provided to the viewer in a graphical interface displayed on the monitor. The viewer may select one or more of these parameters at any time during the viewing of visual content in order to personalize the data being displayed with the visual content. For example, the viewer can select what information is to be displayed and the nature of its display, including the format, location on the screen, frequency of display, frequency of update, etc.

In another aspect of the invention, if the STB does not have access to a data server, information can be inserted into the broadcast stream at the source of the broadcast, typically a broadcast head end or super head end. The available information to be displayed, in this case, will be limited, based on bandwidth and other considerations. A viewer may then customize the information extracted from the broadcast stream in accordance with the techniques of the present invention. For example, as in the case of information retrieved from the Internet or from a dedicated information server, the viewer can select what information is to be displayed (from among the information included in the broadcast stream) and the nature of its display, including the format, location on the screen, frequency of display, frequency of update, etc.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be illustrated in conjunction with an exemplary television broadcast/video receiving system and an Internet connection. It is to be appreciated, however, that the techniques described herein may be applied generally to a wide variety of system environments used to receive and/or display not only television broadcast signals, but visual content in general, including video/audio signals, images, graphics and the like, in either compressed or uncompressed formats. Furthermore, data to be integrated with the visual content may be obtained from a variety of sources other than the Internet, including, for example, a network or dedicated information server or from the received broadcast or video signal. The term "channel" as used herein is intended to refer generally to any type of communication medium for conveying transmitted information, including a wireless communication link, such as, for example, radio frequency, satellite, microwave, etc., and a dedicated communication connection, such as, for example, telephone, cable, fiber optic, etc.

Figure 1:
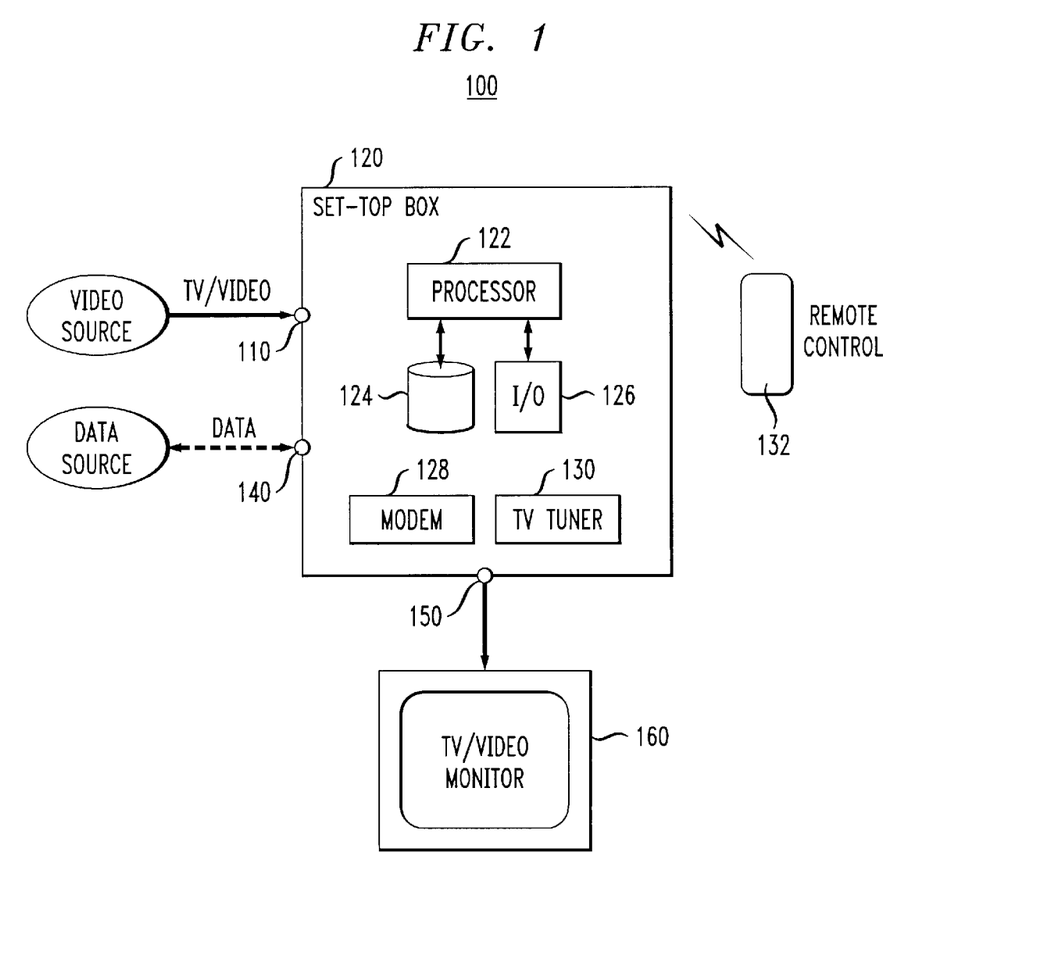
FIG. 1 is a block diagram illustrating a personalized data delivery system, formed in accordance with the present invention.

FIG. 1 illustrates a personalized data delivery system formed in accordance with one aspect of the invention. The personalized data delivery system, particularly when used in a home environment, may be referred to as a personalized "home-cast" system. With reference to FIG. 1, the personalized data delivery system 100 preferably comprises a set-top box (STB) 120, or similar device, which includes at least one television (TV)/video input port 110, for receiving a visual content signal (e.g., television or video) from any number of sources including, for example, a television broadcast station, video camera, video game, etc. This visual content signal may be from a cable, satellite, or terrestrial broadcast, or it may be from a source of prerecorded video, such as from a video cassette recorder (VCR) or digital video disk (DVD) player. The STB 120 may include multiple television/video input ports and a multiplexer or equivalent switching circuitry (not shown) for selecting one of multiple visual content sources to view.

The STB 120 further includes at least one output port 150 which is preferably operatively coupled to a television/video display or monitor 160, such as a conventional television receiver or a suitable equivalent thereof, for displaying enhanced visual content supplied by the STB 120. The enhanced visual content essentially comprises the original visual content signal which has been integrated with personalized data in accordance with the methodologies of the present invention. The output port 150 may provide a modulated output signal (assuming the STB 120 includes a television broadcast modulator), rather than separate audio and video output signals, which can be particularly useful with television receivers that include only an "antenna" or "cable" input connection and do not include video and audio input connections (as is sometimes the case for older television other suitable data storage media, which is preferably accessed via a network such as, for example, the Internet. The STB 120 preferably include the data input port 140, thereby facilitating communication over, for example, the Internet via a conventional telephone line or similar data access channel. Alternatively, an external modem may be supplied and connected to the STB 120 in a conventional fashion, such as, for example, via an RS-232 port (not shown) included in the STB, in which case modem 128 maybe omitted from the STB 120.

For added viewing convenience, the personalized home-cast system 100 preferably includes a remote control device 132 which operatively communicates with the STB 120, preferably by way of a wireless link (e.g., infrared). The remote control device 132 preferably operates in conjunction with the STB 120 for remotely viewing and/or modifying one or more features, options and/or settings of the STB 120. Additionally, the remote control device 132 may be operatively configured to control one or more features, options and/or settings of other audio/video equipment, for example, a television receiver, audio amplifier, DVD player, etc., which may comprise a viewer's home theater system, essentially eliminating the need for a separate remote control device for each audio/video unit.

The remote control device 132 may include one or more function keys or buttons that are uniquely specific to the STB 120. For example, the remote control device 132 preferably includes up, down, right and left "tab" keys for positioning a cursor or similar viewer-manipulated operator and highlighting and/or selecting a desired object or area displayed on the monitor 160. A track ball, roller ball, joystick, or similar pointing device may also be included in the remote control device 132 for performing an equivalent function. Similarly, the remote control device 132 may include a number of keys having functions that can be universally employed to control other electronic equipment, such as, for example, power, volume up/down, channel up/down, etc.

As shown in FIG. 1, the STB 120 may be implemented in accordance with a processor 122, memory 124 and I/O devices 126, which is preferably used to run applications programs for controlling the integration of the television/video information with personalized data content. It is to be appreciated that the term "processor" as used herein is intended to include any processing device, such as, for example, one that includes a central processing unit (CPU) and/or other processing circuitry (e.g., microprocessor). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "input/output devices" or "I/O devices" as used herein is intended to include, for example, one or more input devices (e.g., keyboard, mouse, etc.) for entering data to the processor, and/or one or more output devices (e.g., printer, monitor, etc.) for presenting the results associated with the processor.

Accordingly, an application program, or software components thereof, including instructions or code for performing the methodologies of the invention, as will be further described herein, may be stored in one or more of the associated storage media (e.g., ROM, fixed or removable storage) and, when ready to be utilized, loaded in whole or in part (e.g., into RAM) and executed by the processor 122. Preferably, an application program running on the STB 120 renders output information, which comprises video and integrated viewer-personalized data, on the television/video monitor 160, preferably in the form of graphics and/or text. The present invention contemplates that circuitry for implementing the methodologies of the invention, namely, the processor 122, memory 124 and I/O devices 126, may be included in the television/video monitor 160, thereby eliminating the need for a separate STB unit.

The STB 120 preferably includes a television tuner 130 which is operatively coupled to the television/video input port 110. As appreciated by those skilled in the art, the television tuner 130 demodulates television broadcast signals received from, for example, a terrestrial source, a satellite, or from a cable television system in a conventional manner. The demodulated television signal generated by the television tuner 130 is preferably displayed on the monitor 160 via the output port 150.

An important aspect of the present invention is its ability to dynamically integrate viewer-personalized data, received from a content server or other data source, with a video frame comprising television/video information received from a television or video source, and to display the resulting output in a manner customizable by the viewer, thus essentially creating a personalized home-cast. As such, application software running on the STB may operate consistent with a traditional Web browser in the sense that it is able to access specific Web sites/pages and retrieve information contained therein. However, the personalized home-cast system of the invention is novel in that, unlike conventional Web browsing systems and/or methodologies, data obtained from a Web page or equivalent content server is not bound by a traditional preset presentation format (e.g., as is the case with a Web page). Instead, the STB and associated application program running on the STB, in accordance with the present invention, uniquely integrates the data obtained from a content server (or other information source) with the video frame (e.g., television/video information) for display to the viewer in a manner which is selectable by the viewer.

As stated herein, an application program(s) running on the processor 122 of the STB 120 essentially controls the client-side operation of the personalized home-cast system. The processor 122 is programmed in accordance with a set of instructions or programs which may be stored at various times in memory 124 in or downloaded to the STB 120. At execution, these programs and instructions are read, in whole or in part, by the processor 122 from memory 124. It is to be appreciated that the invention as described herein includes those various computer-readable media when such media contain instructions or programs for implementing the desired steps in conjunction with a processor.

Preferably, the personalized home-cast system 100 includes an operating system or other suitable interface platform, one or more application programs and program data. As stated previously herein, such application programs and components thereof may reside at various times in memory 124. The operating system within which the application programs run is preferably a multitasking operating system employing a graphical user interface in a windowing environment. Examples of such operating systems suitable for use with the present invention may include, for example, a commercially available STB real-time operating system (OS), preferably VxWorks® (Wind River Systems, Inc.), pSOS® (Wind River Systems, Inc.), PowerTV (PowerTV, Inc.), OpenTV (OpenTV, Inc.), etc., although other suitable types of OS may be used, such as Linux or Windows, as appreciated by those skilled in the art.

As shown in FIG. 1, the STB 120 is preferably connected to the Internet (and associated Internet Service Provider) or to a dedicated information server via data input port 140. The STB 120 preferably allows a viewer to designate a source of data content, such as, for example, by specifying one or more uniform resource locator (URL) addresses associated with an Internet Web page(s) which the viewer chooses to monitor. URL addresses may be specified by the viewer, for example, using an input device 126 (e.g., keyboard) coupled to the STB, or the viewer may choose among URL addresses which are downloaded to the STB and made available for viewer selection using the remote control device 132. Furthermore, the designated data source(s) or the information to be obtained therefrom may preferably be modified at any time by the viewer (e.g., via an options or setup menu).

Assuming an Internet connection is provided for use with the personalized home-cast system of the invention, the STB application program preferably behaves consistent with a Web browser, using a viewer-specified URL address (or a default URL address) to access a data item or items. Rather than displaying the entire Web page, however, the STB application program preferably retrieves only the item(s) of information requested by the viewer and displays the item(s) using display parameters specified by the viewer (or default display parameters). It is preferred that the specified URL address(es) be prescreened by a system designer or by the viewer to insure that it will be clear to the application program where requested items are to be located on the display screen. Alternatively, extensible markup language (XML), or a suitable equivalent thereof, may be employed to help identify information contained in a given Web page to the STB application program, which parses the XML and selects only the desired item(s). It is further contemplated that dedicated Web pages may be created (e.g., by a system designer) that are specifically adapted for use with the home-cast system of the present invention.

The URL address (or similar identifier) of a selected data content provider may be stored, for example, in a viewer configuration file, preferably in nonvolatile memory resident in the STB so that the desired selection information is maintained even after power has been removed from the STB. This viewer configuration file preferably stores other viewer-specific information in a similar manner. Since more than one viewer may share a single STB, the STB is preferably capable of storing multiple viewer configuration files, either within memory 124 comprising the STB 120 or such information may be read from, for example, external memory media (e.g., diskette, smart card, etc.) supplied by the viewer.

A dedicated information server can be used where the STB includes an available telephone connection but no Internet access (e.g., no Internet Service Provider), and thus cannot specify arbitrary Web addresses as an information source. The dedicated information server preferably operates essentially like a voice response system (VRS) in that it may offer, from a tree-structured menu, a number of information options, such as, for example, sports events, weather, etc. Unlike a VRS, the dedicated information server preferably responds to modem tones which are generated by the STB application, similar to a conventional dial-in server.

It is to be appreciated that if no data channel is available, or if the STB 120 does not support a separate data connection, information to be integrated with the television/video content must be carried in the broadcast television signal or prerecorded video signal itself and extracted therefrom by the STB 120 for display. The STB 120 may include additional circuitry (not shown) for performing this extraction function. For example, a broadcast station may embed information of general interest in the broadcast stream, such as the categories and corresponding information shown in Table 1 below. In such instances, the viewer will essentially only be able to filter (e.g., display or not display specific information) selective content from the available information contained in that signal.

Figure 2:
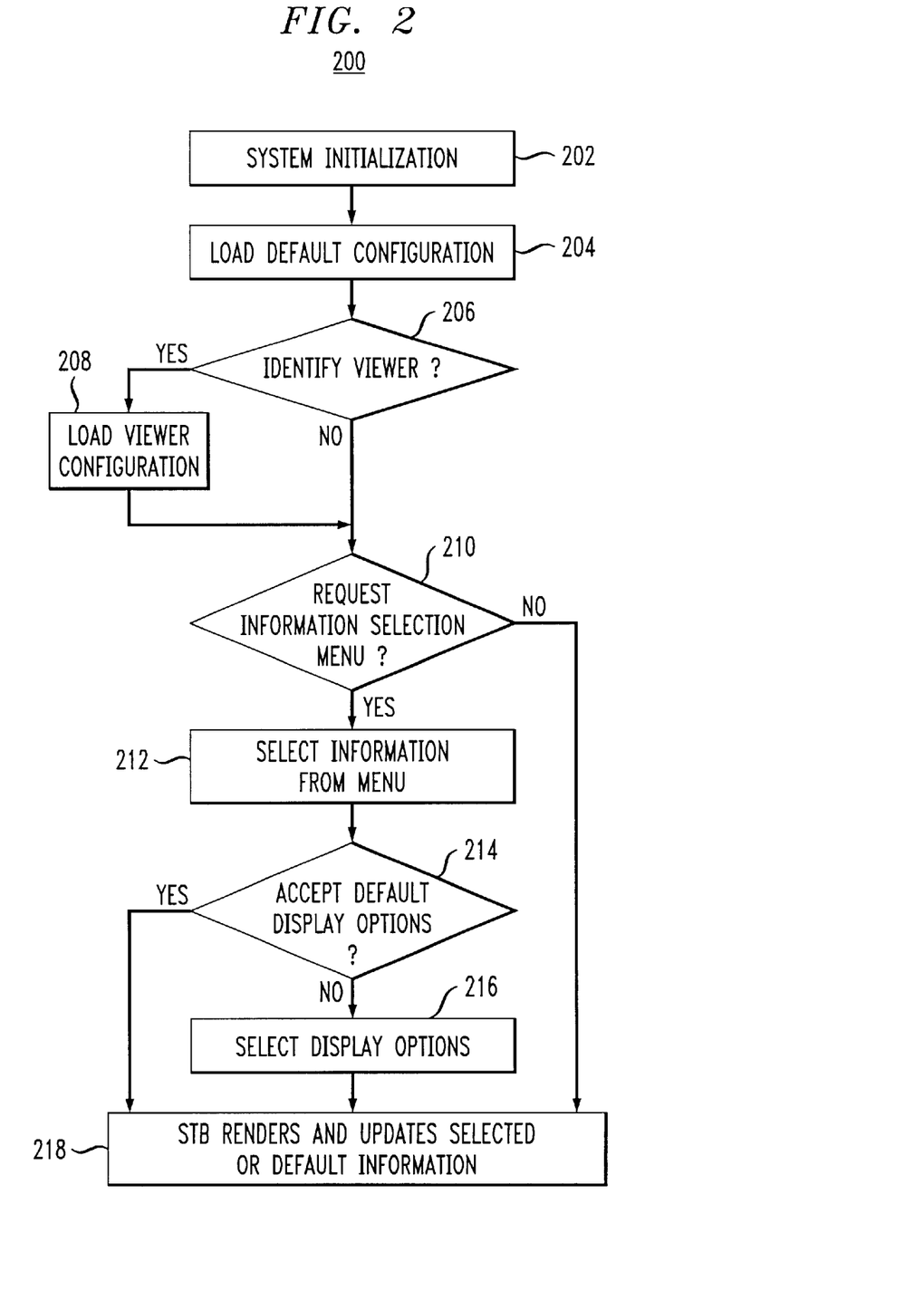
FIG. 2 is a logical flow diagram depicting one embodiment of an application procedure capable of running on the data delivery system of FIG. 1, in accordance with the invention.

Whether or not a data input channel is available to the STB (or whether or not the STB includes such capability), the application program running on the STB will preferably follow a substantially similar procedure for selecting and/or personalizing data to be displayed on a monitor during the viewing of a particular television program or video content. An illustrative logical flow diagram for an exemplary data personalization procedure 200, in accordance with one embodiment of the invention, is shown in FIG. 2. With reference now to FIG. 2, a system initialization routine 202 is preferably first performed which may include, for example, a system self-test, or any setup procedures which may be required at power-up. Next, personalization procedure 200 preferably loads a default viewer configuration file 204 (e.g., from memory included in the STB) containing system parameter information and display preferences of a default viewer. A default viewer may simply be the most recent viewer to use the system or, alternatively, a default viewer may be a viewer preselected and maintained by the STB. Preferably, the default viewer can be modified and saved at any time as desired.

As stated herein above, since, in many households, multiple viewers may share a STB, the personalization procedure 200 preferably offers a viewer an opportunity to identify him/herself 206. Assuming such identification is requested, a viewer configuration file corresponding to the identified viewer is loaded 208 either from memory comprising the STB or from storage media supplied by the viewer (e.g., diskette, flash card, etc.). After the viewer's configuration file has been loaded 208 or if no viewer identification is requested, the personalization procedure 200 preferably determines whether the viewer would like an information selection menu to be displayed 210. If no information selection menu is requested, the procedure 200 preferably instructs the STB to render and update the viewer-selected or default information 218 on the television/video monitor.

If the viewer has requested an information selection menu to be displayed, the viewer preferably selects from a menu of information options 212. These information options affect, at least in part, the operation of the personalized home-cast system. Menu options initially displayed may include a predetermined set of default display options and/or settings. Preferably, the viewer is given an opportunity to either accept the default display options or specify new display options as desired. Accordingly, the data personalization procedure 200 preferably determines whether or not the viewer accepts the default information options for display 214. If so, the STB receives, renders and updates the incoming default information 218 on the television/video monitor throughout a viewing session, or until instructed otherwise by the viewer. If the viewer chooses not to accept the default information options, an information selection menu is preferably displayed and the viewer selects the desired information to be rendered 216, thus personalizing the viewing session. The STB then receives, renders and updates the incoming personalized information 218 on the television/video monitor throughout the viewing session.

Figure 3A:
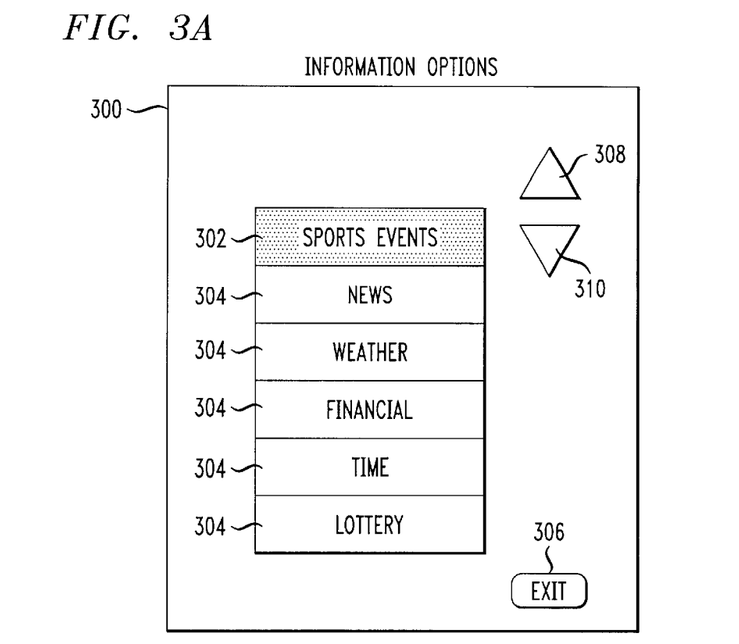
FIG. 3A is a graphical representation depicting an illustrative embodiment of an information selection menu displayed as part of a setup procedure, in accordance with one aspect of the invention.

By way of example only, FIG. 3A depicts an information selection or options menu 300, in accordance with an illustrative embodiment of the present invention. The information selection menu is preferably graphically displayed by entering a setup mode at any time during viewing. The viewer may enter the setup mode, for example, by pressing a "menu" key on the remote control or as one of several selections offered in an Electronic Program Guide (EPG). With reference now to FIG. 3A, the information which is currently available for display is preferably indicated to the viewer. The information included in the information selection menu 300 is preferably displayed in a hierarchical fashion such that information relating to more general categories or topics (e.g., Sports Events, News, Weather, Financial, Time, Lottery) are displayed in a first hierarchical level, with more detailed information relating to a selected data item or category being displayed with each successive menu level (e.g., a level 3 menu displays more details than a level 2 menu, which displays more details than a level 1 menu, etc.). Table 1 below illustrates an example of the type of information which may be displayed in the information selection menu with each hierarchical level selected.

TABLE 1

Example Information Selection Menu in Home-Cast System

| Category | Level 1 Information | Level 2 Information | Level 3 Information |
|---|---|---|---|
| Sports events | Event score | Detailed event info, event progress info | Statistics, summary of event highlights |
| News | Brief headlines | Extended headlines | Synopses of top stories |
| Weather | Local temperature | Conditions, forecast | Extended forecasts |
| Financial information | Selected stock prices, indices | Charts, news brief headlines | Business news summaries |
| Time | Current time, date | | |
| Lottery | Winning numbers | Information | |

Preferably, level one information is obtained by the STB and displayed without requiring viewer input. In the case of an Internet connection as the data content provider, the URL address for a level two data item which may be associated with a particular level one item is preferably received at the STB along with that level one data item. This received URL address is then used to retrieve the level two data item, if the viewer indicates an interest in that item. Similarly, the URL address for an associated level three data item (if present) is preferably received along with the level two data item, and so forth.

With continued reference to FIG. 3A, a viewer may select a desired category 302, scrolling through the available categories 302, 304 by clicking on the on-screen up arrow ("△") 308 or down arrow ("▽") 310 display buttons on the information selection menu 300. A desired category may also be selected in response to activation of a viewer-manipulated operator (e.g., cursor), as known by those skilled in the art. Similarly, the viewer may use buttons designated for such functions on the remote control device. The information selection menu 300 may also include an "EXIT" button 306 to enable the viewer to exit the menu at any time and return to a normal viewing mode. Preferably, scrolling results in a highlighted area surrounding one of the options categories 302 to distinguish it from other categories 304 in the information options list. Once a highlighted category 302 is selected by the viewer, such as by pressing an "Enter" or "Select" button on the remote control, another menu options screen 320 is preferably displayed which includes more detailed information options relating to the selected category 302, in this case "Sports Events," as shown in FIG. 3B.

Figure 3B:
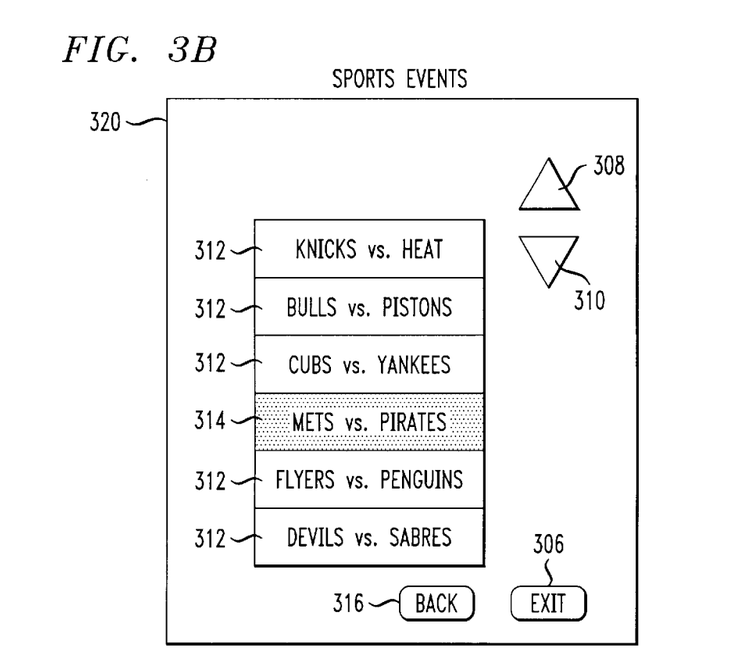
FIG. 3B is a graphical representation depicting the result of a viewer's selection of a category from the example menu shown in FIG. 3A.

With reference now to FIG. 3B, information options relating to the selected category (e.g., "Sports Events") are preferably displayed which may include team names for example, 312, 314, or other desired information selections. The viewer again preferably scrolls among the available options 312, 314, using either the up arrow 308 or down arrow 310 display buttons displayed on the information selection menu 320 or on the remote control to highlight a desired sports event 314, and presses "Enter" or "Select." It is to be appreciated that the list of available options may be changed at any time by the viewer, broadcaster, or other entities, such as by adding new categories or deleting existing categories and any information corresponding thereto. The on-screen menu 320 may also include a "BACK" button 316 which allows the viewer to return to a previous option screen. Such feature may also be provided on the remote control. This "back" feature preferably functions in a manner similar to the "Back" button on a conventional Web browser, for example.

If further detailed options or information relating to a desired choice are available, those options are preferably displayed in another on-screen menu (not shown) when the particular highlighted choice 314 is selected by the viewer. As stated previously herein, the menu options are preferably displayed in a hierarchical fashion. This reduces the number of menu options that need to be displayed on any one screen, thus making the menu more readable. Such additional information options may include, for example, statistics for selected individual players (e.g., batting average, home runs, etc. of a particular baseball player), summary of selected game highlights, league standing of a selected team (e.g., wins and losses), player trade information, etc.

In addition to specifying the source of the information to be retrieved and displayed (e.g., Internet, broadcast signal, dedicated content server, etc.) and/or the types of information available for selection, the viewer may preferably specify/modify other information and system parameters in essentially the same manner, including, for example, the frequency of information display and/or update, the use of an information icon, remote control key designation for on-demand information display/update, size and placement (on screen) of display text and/or graphics, setting the magnitude of change in predetermined information for alerts, characteristics (e.g., audio, video, etc.) of information alerts, etc. Certain options may also be presented for personalizing the timing of information displayed. For example, for each item of information the viewer may preferably specify a permanent display of information, a periodic display, display on demand (e.g., the viewer can manually select a remote control button or other means for displaying requested information), display only if a predetermined alert condition is present, etc.

Figure 4A:
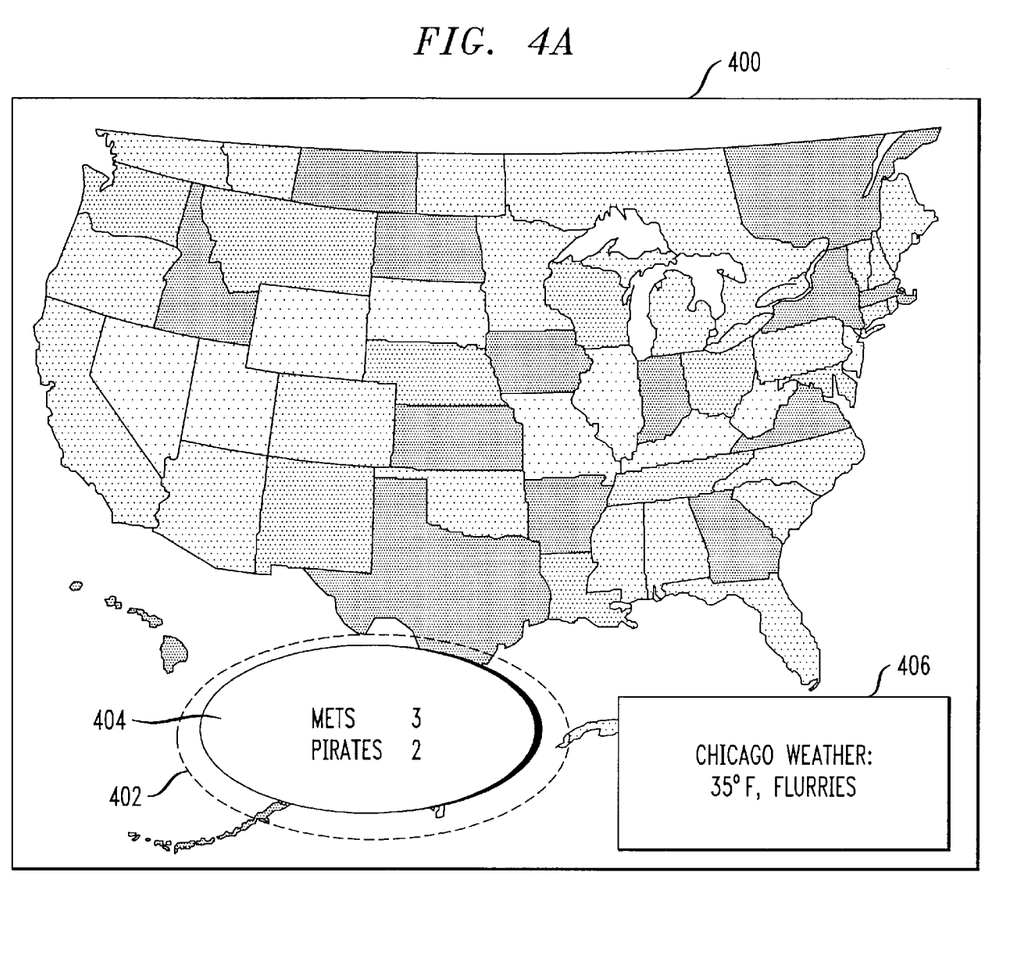
FIG. 4A is a graphical representation depicting an illustrative embodiment of a television/video screen including personalized data integrated with visual content, in accordance with the invention.

By way of example only, the viewer may select any one or more of the following options during the setup procedure or throughout a viewing session:

- display current stock price for IBM
  - update information every two minutes and when requested with on-demand update key on remote control
  - display selected information for 30 seconds every five minutes and when requested with on-demand display key on remote control
  - no information icon (default)—display "level 1" information instead
  - VCR "stop" key designated for on-demand information display
  - VCR "rewind" key designated for on-demand information update
  - display text in 1 inch square with transparent background
  - display text in upper right corner of screen
  - set alert for plus or minus one unit change of a selected stock
  - use audio beeps for alert As shown in FIG. 4A, information based on a category or categories specified by the viewer is preferably operatively displayed by the STB by superimposing personalized text and/or graphic objects 404, 406 (e.g., from a specified data source) over an existing television/video plane 400 (e.g., a selected television program). The text and/or graphics may be extracted from the broadcast signal or obtained from an information source, such as the Internet or other information server, and rendered by the STB. The information to be overlaid with the television/video content will be based upon specified selections from the information selection menu, as described herein above, or based upon predetermined default selections. Details regarding the source of the information, number of information choices displayed, frequency of information update, appearance of the display, etc., are preferably specified/modified by the viewer (or left at default values) at any time during the viewing session in a manner similar to the selection and/or modification of other information options from the information selection menu, as previously described herein in connection with FIGS. 3A and 3B. In a preferred embodiment of the invention, the display of personalized information on the television/video plane is operatively performed using an on-screen video overlay display capability of a video decoder included in the STB (not shown).

With continued reference to the exemplary display screen of FIG. 4A, two items of information, namely, a weather display 406 and a sports event score display 404, have been requested by the viewer. The sports display 404 is shown highlighted 402, indicating that it will be selected if the viewer presses "select" or "enter" on the remote control, for example. It is to be appreciated that the viewer may specify the level of information corresponding to a selected category which is to be displayed. Preferably, level 1 information is displayed without requiring viewer input. Since the information is preferably organized in a hierarchical fashion, more information (if available) relating to each desired item in turn may be displayed preferably by selecting the currently displayed item in a conventional manner. Viewer input in response to level 1 information preferably causes the application program to display level 2 information, if available, etc. As noted previously, successive levels of information preferably represent more detailed information being presented.

Figure 4B:
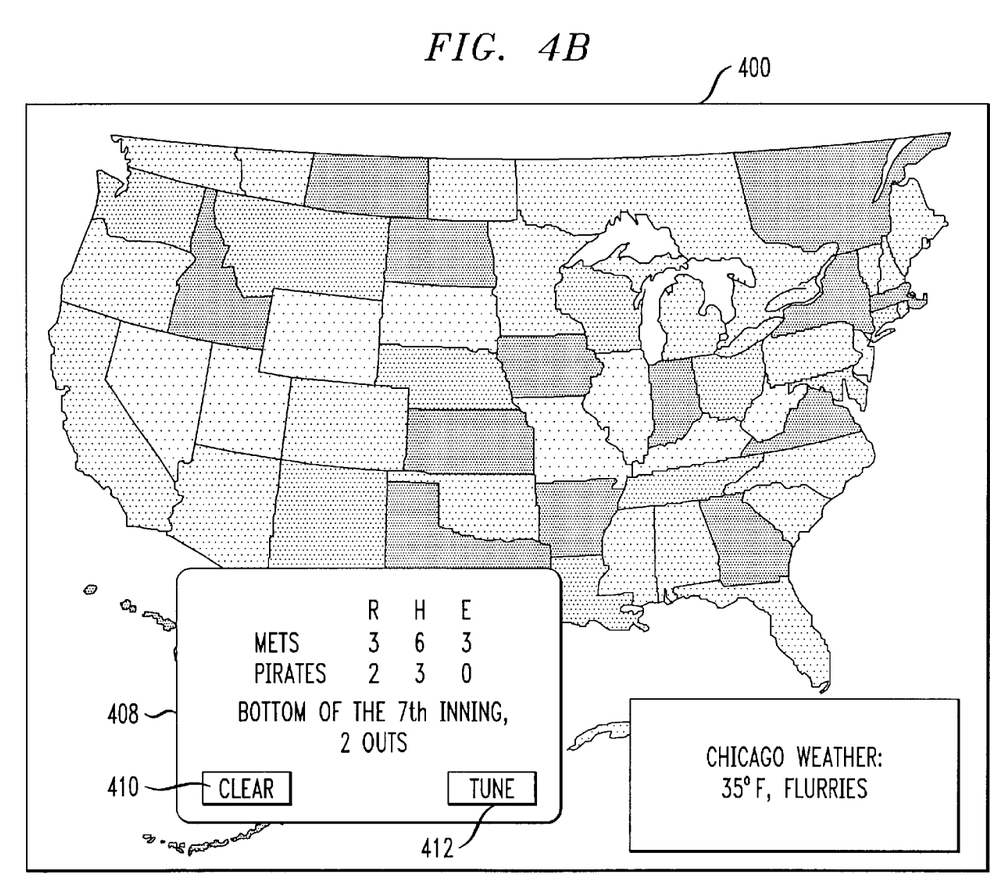
FIG. 4B is a graphical representation depicting the result of a selection of highlighted data shown in FIG. 4A.

By way of example only, FIG. 4B depicts an illustrative display 408 that may be presented when the sports information box 404 (in FIG. 4A) is selected by the viewer. With reference to FIG. 4B, a more detailed sports information display 408 is preferably presented, superimposed on the television/video plane 400. Rather than simply displaying a score (e.g., level 1 information), further details of the selected sports event may be provided in this second information level (e.g., runs, hits, errors, current inning, number of outs, etc., for a baseball game). The viewer preferably has an option of clearing this display, for example by selecting a "clear" on-screen button 410 or a designated button on the remote control, resulting in either a return to the prior sports information display 404 shown in FIG. 4A or the sports information box may be removed from the screen entirely, depending on how the viewer specifies the parameters of this feature.

In another aspect of the invention, the viewer is preferably given an option to tune to the channel of the selected sports event, for example by selecting a "tune" on-screen button 412, or by pressing a designated button on the remote control. To accomplish this, the viewer may be required to initially designate a channel which corresponds to a particular sports event. Alternatively, it is contemplated that the STB application program may be operatively configured to retrieve information regarding what channel the specified sports event is being broadcast on (e.g., via information obtained from program information supplied in the broadcast stream, an EPG, or the Internet) and automatically change the current television channel accordingly.

Figure 5:
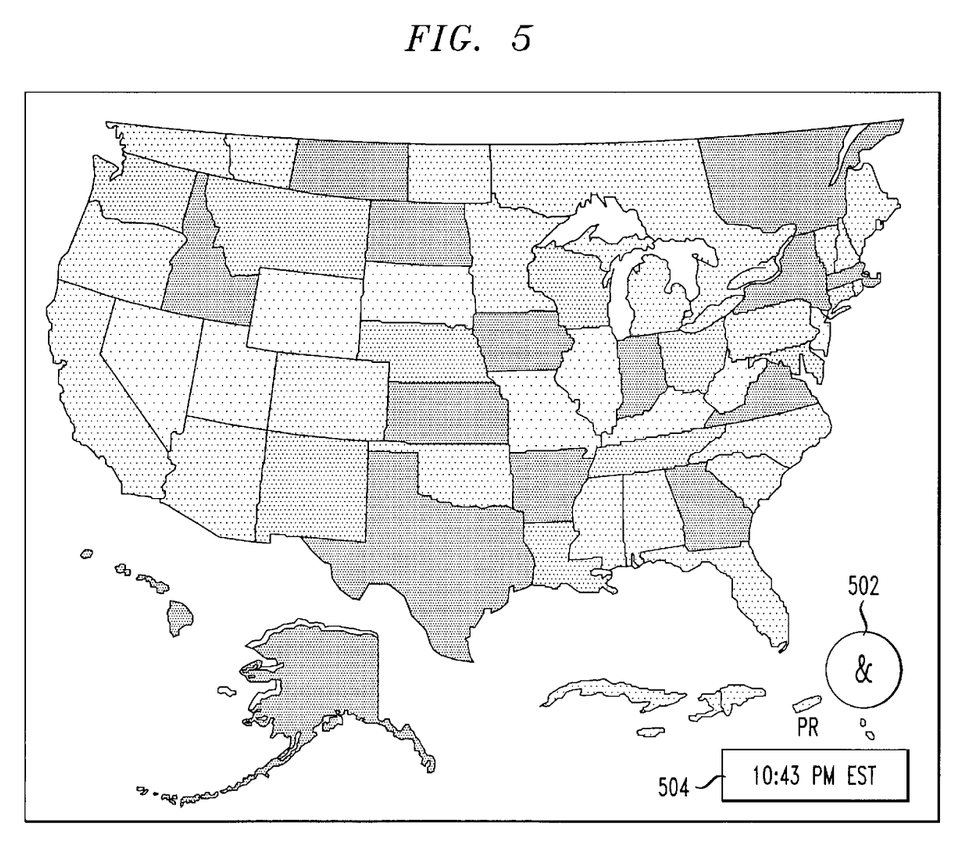
FIG. 5 is a graphical representation depicting another illustrative embodiment of a television/video screen including personalized data integrated with visual content, formed in accordance with the invention.

Referring now to FIG. 5, the application program preferably provides the viewer with an option of requesting, for example during the setup procedure or at any other desired time, that a predetermined information icon, such as an ampersand in a circle 502 or other suitable indicator, be displayed to indicate the availability of information. This option is preferably controlled by modifying a setting or value in the information selection menu or by a designated key on the remote control. If such feature is enabled by the viewer, only the predetermined information icon or indicator will appear (e.g., in a corner of the screen) when information becomes available, rather than having the information appear on the screen at all times, thus minimizing disruption of the viewing session. In this manner, the level one information will only be displayed when the viewer "selects" (e.g., by pressing an "Enter" button on the remote control or similar means) the information icon 502. As shown in FIG. 5, the viewer may also specify that certain predetermined information, such as the current time 504, remain on-screen at all times, or until such display characteristic is modified by the viewer.

In another aspect of the invention, the viewer preferably has an option of enabling and/or specifying the nature of certain alarms or alert indicators which can be added to the display environment. Such alert indicators may be visual and/or audible and include, for example, a flashing text or icon graphic which appears on screen if a predetermined change occurs in the information being displayed. For example, a flashing green up arrow graphic or red down arrow graphic can be set to appear on the screen when the price of a stock which the viewer has requested to display/monitor rises or falls, respectively, by more than a specified amount (e.g., two points). Additional alert indicators which may be employed in accordance with the invention may include, for example, audio beeps, flashing information icon, flashing information display, forced channel change (e.g., tune to sports event if score changes), etc. It is further contemplated that the STB preferably includes a telephone notification feature, wherein the STB application program operatively dials a viewer's pager or other specified telephone number (e.g., cellular telephone, office telephone, personal data assistant (PDA), etc.). This feature may be advantageous in situations where, for example, the viewer desires to monitor and be alerted to specified information even when the viewer is not viewing.

Figure 6:
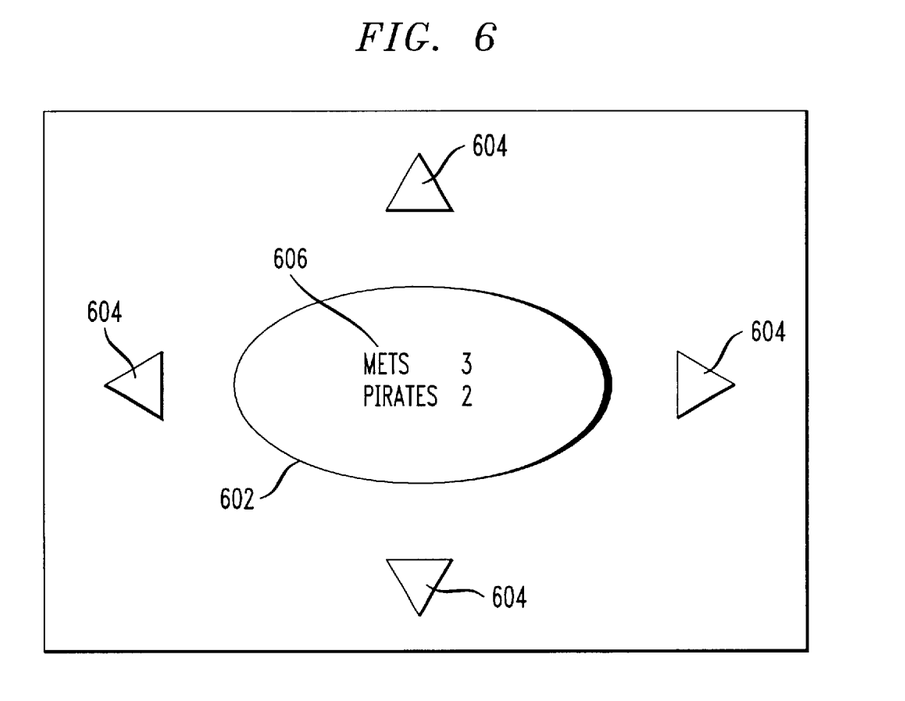
FIG. 6 is a graphical representation depicting a method of positioning a selected graphic object on a display screen, in accordance with an illustrative embodiment of the invention.

If the viewer desires to use default system values for graphic/text position, size, display timing, etc., he/she can return to program viewing after the initial setup procedure, and information regarding a selected sports event(s) will be overlaid on the screen at the predetermined default position, size, etc. However, if the viewer desires additional customization, another menu can be requested (e.g., by pressing a designated key on the remote control or similar means) allowing a choice of display parameters to be modified. For example, as shown in FIG. 6, the viewer preferably uses on-screen left, right, up, or down arrow keys 604 to position the graphic 602 or text item 606 at a desired location on the screen. The graphic or text item may also be sized in a similar manner. Alternatively, the application program may provide "click-and-drag" capability for positioning and/or sizing an object on the screen, as is found in conventional graphical user interfaces. As for essentially all on-screen buttons, the viewer may also preferably designate one or more buttons on the remote control to perform the same function as an on-screen button.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A personalized data delivery system for dynamically integrating viewer-specified data with visual content, the personalized data delivery system comprising:

an input port for receiving a visual content signal, the visual content signal including visual content and data embedded in the visual content signal;

an output port for displaying enhanced visual content on a display screen, the enhanced visual content including the received visual content and at least a portion of the received data; and an interface operatively coupled to the input port and the output port, the interface including:

a processor responsive to one or more viewer personalization parameters and being operative to: (i) extract at least a portion of the data received from the visual content signal; and (ii) generate the enhanced visual content by selectively visually integrating at least a portion of the received data with a video frame in accordance with the viewer personalization parameters; and memory coupled to the processor, the memory storing at least one of the viewer personalization parameters and the received data;

wherein the viewer personalization parameters correspond to a manner in which the received data is to be displayed with the visual content on the display screen, at least a portion of the viewer personalization parameters being specified by a viewer.

2. The system of claim 1, further comprising:

another input port for receiving at least one of visual content from a visual content source and data; and a multiplexer operatively coupled to the input ports and the interface, the multiplexer being responsive to the processor for selectively displaying visual content from at least one of the input port and the other input port on the display screen.

3. The system of claim 1, further comprising:

a remote control, the remote control operatively communicating with the processor for accessing the viewer personalization parameters.

4. The system of claim 3, wherein the remote control communicates with the processor via a wireless communication link.

5. The system of claim 3, wherein the remote control includes a mechanism for performing at least one of: (i) positioning a viewer-manipulated operator on the display screen; and (ii) selecting a desired object on the display screen.

6. The system of claim 1, further comprising a viewer configuration file, the viewer configuration file including viewer-specific information corresponding to a manner in which the received data is displayed with the visual content on the display screen for a selected viewer.

7. The system of claim 1, wherein the processor is further operative to: (iii) present an information selection menu to a viewer for display on the display screen, the information selection menu comprising a plurality of options which at least partially affect an operation of the personalized data delivery system.

8. The system of claim 7, wherein information relating to a selected data item in the information selection menu is presented hierarchically, whereby more detailed information associated with the selected data item is displayed in a successive hierarchical level.

9. The system of claim 1, wherein the viewer-specified data integrated with the video frame is at least one of: (i) periodically updated in accordance with the viewer personalization parameters; and (ii) manually updated by the viewer.

10. A personalized data delivery system for dynamically integrating viewer-specified data with visual content, the personalized data delivery system comprising:

an input port for receiving visual content from a visual content source;

a data port for performing at least one of: (i) receiving data from a data content source; and (ii) sending requests for viewer-specified data from the data content source;

an output port for displaying enhanced visual content on a display screen, the enhanced visual content including the received visual content and at least a portion of the received data; and an interface operatively coupled to the input port, the data port and the output port, the interface including:

a processor being responsive to one or more viewer personalization parameters and operative to generate the enhanced visual content by selectively visually integrating at least a portion of the received data with a video frame in accordance with the personalization parameters; and memory coupled to the processor, the memory storing at least one of the viewer personalization parameters and the received data;

wherein the viewer personalization parameters correspond to a manner in which the received data is to be displayed with the visual content on the display screen.

11. The system of claim 10, wherein the data port is operatively connected to the Internet.

12. The system of claim 11, wherein the data content source is a Web page and the data is selectively retrieved from the Web page in accordance with the viewer personalization parameters.

13. The system of claim 10, wherein the data port is operatively connected to the memory.

14. The system of claim 11, wherein the data port is operatively connected to a dedicated information server.

15. The system of claim 10, further comprising:

a remote control, the remote control operatively communicating with the processor for accessing the viewer personalization parameters.

16. The system of claim 15, wherein the remote control communicates with the processor via a wireless communication link.

17. The system of claim 15, wherein the remote control includes a mechanism for performing at least one of: (i) positioning a viewer-manipulated operator on the display screen; and (ii) selecting a desired object on the display screen.

18. The system of claim 10, further comprising a viewer configuration file, the viewer configuration file including viewer-specific information corresponding to a manner in which the received data is displayed with the visual content on the display screen for a selected viewer.

19. The system of claim 10, wherein the processor is further operative to present an information selection menu to a viewer for display on the display screen, the information selection menu comprising a plurality of options which at least partially affect an operation of the personalized data delivery system.

20. The system of claim 19, wherein information relating to a selected data item in the information selection menu is presented hierarchically, whereby more detailed information associated with the selected data item is displayed in a successive hierarchical level.

21. The system of claim 10, wherein the viewer-specified data integrated with the video frame is at least one of: (i) periodically updated in accordance with the viewer personalization parameters; and (ii) manually updated by the viewer.

22. A method of dynamically integrating viewer-specified data with visual content, the method comprising the steps of:

receiving a visual content signal;

retrieving data from at least one of a data content source and the received visual content signal;

specifying one or more viewer personalization parameters, the viewer personalization parameters operatively controlling a manner in which at least a portion of the retrieved data is displayed on a display screen;

generating an enhanced visual content signal by selectively visually integrating at least a portion of the retrieved data with a video frame in accordance with the viewer personalization parameters; and displaying the enhanced visual content on the display screen.

23. The method of claim 22, further comprising the step of:

presenting an information selection menu to a viewer for display on the display screen, the information selection menu comprising a plurality of options, each option at least partially affecting an integration of personalized data with the video frame.

24. The method of claim 23, wherein the step of presenting the information selection menu further comprises the step of displaying information relating to a selected data item in the information selection menu in a hierarchical manner, whereby more detailed information pertaining to the selected data item is displayed in a successive hierarchical level.

25. The method of claim 22, further comprising the step of:

storing the viewer personalization parameters in memory; and retrieving viewer personalization parameters corresponding to a selected viewer from memory.

* * * * *

UNITED STATES PATENT AND TRADEMARK OFFICE
CERTIFICATE OF CORRECTION

PATENT NO. : 6,806,887 B2
DATED : October 19, 2004
INVENTOR(S) : R.S. Chernock et al.

It is certified that error appears in the above-identified patent and that said Letters Patent is hereby corrected as shown below:

<u>Title page,</u>
*Assistant Examiner*, delete "Cunnigham" and insert -- Cunningham --

<u>Column 15,</u>
Line 15, delete "11" and insert -- 10 --

Signed and Sealed this

Twenty-eighth Day of December, 2004

JON W. DUDAS
*Director of the United States Patent and Trademark Office*